United States Patent
San Filippo, III

(10) Patent No.: US 7,068,630 B1
(45) Date of Patent: *Jun. 27, 2006

(54) METHOD FOR MEASURING LOAD BETWEEN MCDN DEVICES FOR USE IN DETERMINING PATH WITH OPTIMAL THROUGHPUT

(75) Inventor: William E. San Filippo, III, Soquel, CA (US)

(73) Assignee: Ricochet Networks, Inc., Denver, CO (US)

( * ) Notice: Subject to any disclaimer, the term of this patent is extended or adjusted under 35 U.S.C. 154(b) by 1080 days.

This patent is subject to a terminal disclaimer.

(21) Appl. No.: 09/920,081

(22) Filed: Jul. 31, 2001

(51) Int. Cl.
*H04B 7/212* (2006.01)

(52) U.S. Cl. .................... 370/337; 370/347; 370/350

(58) Field of Classification Search ............... 370/337, 370/347, 338, 252, 350, 503
See application file for complete search history.

(56) References Cited

U.S. PATENT DOCUMENTS

| | | | |
|---|---|---|---|
| 4,129,755 A * | 12/1978 | Murakami ................. | 370/350 |
| 4,718,081 A | 1/1988 | Brenig | |
| 4,780,885 A | 10/1988 | Paul et al. | |
| 4,850,036 A | 7/1989 | Smith | |
| 5,129,096 A | 7/1992 | Burns | |
| 5,253,248 A | 10/1993 | Dravida et al. | |
| 5,257,399 A | 10/1993 | Kallin et al. | |
| 5,280,288 A | 1/1994 | Sherry et al. | |
| 5,355,522 A | 10/1994 | Demange | |
| 5,513,183 A | 4/1996 | Kay et al. | |
| 5,541,954 A | 7/1996 | Emi | |
| 5,546,422 A | 8/1996 | Yokev et al. | |
| 5,619,493 A | 4/1997 | Ritz et al. | |
| 5,737,358 A | 4/1998 | Ritz et al. | |
| 5,790,534 A * | 8/1998 | Kokko et al. ............... | 370/335 |
| 5,805,633 A | 9/1998 | Uddenfeldt | |
| 5,818,828 A * | 10/1998 | Packer et al. ............... | 370/346 |
| 5,898,925 A * | 4/1999 | Honkasalo et al. ......... | 455/437 |
| 5,937,002 A | 8/1999 | Andersson et al. | |
| 6,023,462 A | 2/2000 | Nieczyporowicz et al. | |
| 6,240,125 B1 | 5/2001 | Andersson et al. | |
| 6,252,861 B1 | 6/2001 | Bernstein et al. | |
| 6,272,313 B1 | 8/2001 | Arsenault et al. | |
| 6,418,138 B1 * | 7/2002 | Cerf et al. .................. | 370/352 |
| 6,507,567 B1 * | 1/2003 | Willars ....................... | 370/321 |
| 2003/0003934 A1 * | 1/2003 | Garces et al. ............... | 455/517 |

OTHER PUBLICATIONS

Rutgers, An Introduction To IGRP, pp. 1-18, Apr. 11, 2001.
Rutgers, Charles L. Hedrick, *Cisco—An Introduction to IGRP*, The State University of New Jersey, Center for Computers and Information Services, Laboratory for Computer Science Research, Aug. 22, 1991, 25 pages.
Kahn, Robert E., et al., *Advances in Packet Radio Technology*, Proceedings of the IEEE, Nov. 1978, vol. 66, No. 11.

* cited by examiner

*Primary Examiner*—Chau Nguyen
*Assistant Examiner*—Jung Park
(74) *Attorney, Agent, or Firm*—Townsend and Townsend and Crew LLP

(57) ABSTRACT

In a packet communication system having a plurality of independently operating nodes which have limited available communication time and which are capable of monitoring busy time and idle time in cyclical epochs, a method is provided for measuring and computing a load on the communication time of the local node in communication with a plurality of other nodes wherein the period of load measurement is synchronized to the communication epoch and the load attributed by the local node is subtracted to assure that the measurement is accurate.

3 Claims, 2 Drawing Sheets

METHOD FOR MEASURING LOAD BETWEEN MCDN DEVICES FOR USE IN DETERMINING PATH WITH OPTIMAL THROUGHPUT

BACKGROUND OF THE INVENTION

This invention relates to digital wireless communication and in particular to management of routing in a wireless network communication system. More particularly this invention relates to load balancing control systems in an environment of a multiple-band, two-way packet communication network, such as one employing frequency-hopping spread spectrum communication among a plurality of nodes. In such a network each node comprises a local autonomous node controller controlling the various channels associated with it, each of which is a radio or other link operating in a specific channel or frequency band and/or packet mode. Terminal node controllers comprise nodes of intelligence which are capable of maintaining multiple concurrently operative links via multiple nodes. The links typically operate independently of one another, concerned only with avoiding incidents of interference when a common channel is used by more than one link.

To improve efficiency of communication, it is desirable to send data to a less contested resource.

This invention was developed in the context of the Metricom Ricochet packet communication network as part of the effort to expand its usefulness beyond the 900 MHz ISM band to take advantage of other bands for subscriber to node communication while at the same time taking advantage of a backbone of wireless and wired communication links. A general familiarity with the technology is helpful background for understanding the environment of this invention.

Use of load information and of other metrics is known for use in load monitoring, control and alternative packet routing. For example, a routing protocol called IGRP deals with some of the problems encountered in using load metrics in routing. For example, in "An Introduction to IGRP," Charles L. Hedrick of Rutgers University describes the Inter-Gateway Routing Protocol and the need to take into account the level of traffic on different paths. U.S. Pat. No. 5,253,248 of Dravida et al. of AT&T Bell Labs issued Oct. 12, 1993 describes how undesired oscillations can occur with the IGRP protocol. Therein congestion is monitored locally. However, the measurement examines only local loading of information communicated to a remote node. The present invention offers a different mechanism to measure load and to enhance performance.

SUMMARY OF THE INVENTION

According to the invention, in a packet communication system having a plurality of independently operating nodes, including a local node of interest as opposed to other nodes (non-local), all of which have limited available communication time and which are capable of monitoring busy time and idle time in cyclical epochs, a method is provided for measuring and computing the relative load on the communication time of the local node in communication with a plurality of the other nodes. In the method, the local node measures its own load and communicates its load to its neighboring nodes and neighboring nodes communicate their loads to the local node. The period of load measurement is synchronized to the cyclical epochs. The portion of load attributed by each node to the total load on a link between nodes is subtracted from the load value to obtain a measurement. As a consequence of the synchronization and the subtraction of load attribution, each node is enabled to develop better load balancing and parent picking algorithms.

The invention will be better understood by reference to the following detailed description in connection with the accompanying drawings.

DESCRIPTION OF SPECIFIC EMBODIMENT

Figure 1:
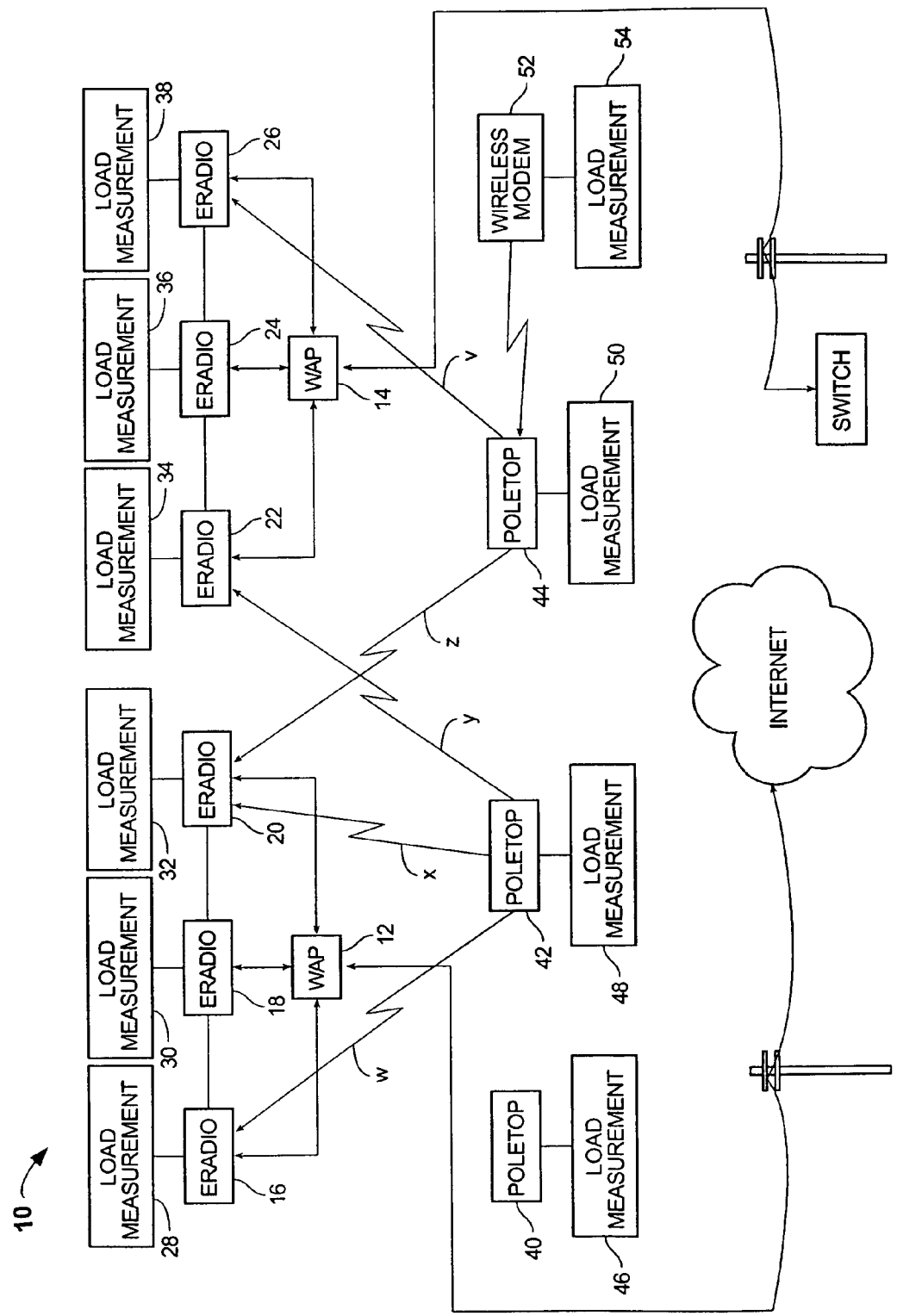
FIG. 1 is a block diagram of a portion of a communication system employing load measurement according to the invention.

The basic problem solved by the invention is the accurate real-time measurement of the communication traffic load between devices or resources within a network. FIG. 1 illustrates elements of a network 10. In a wireless network (which could interface with wired networks), there is a plurality of wired access points (WAPs) 12, 14. At each WAP 12, 14 there is a plurality of so-called e-radios 16, 18, 20; and 22, 24, 26, and associated with each band of each e-radio is an internal load measurement element 28, 30, 32; and 34, 36, 38. Associated with each poletop and each wireless modem is also an internal load measurement element 46, 48, 50 for each band. The same is true for any wireless modem 52 in that a load measurement element 54 is included for each band. Each e-radio, each remote radio, called herein poletops 40, 42, 44, and each wireless modem 52 may "see" several other e-radios, poletops or wireless modems on point-to-point paths such as v, w, x, y, z. The load measurement elements each monitor the traffic on the point-to-point paths v, w, x, y, z between their associated e-radio, poletop and wireless modem. During any one time cycle the internal load measurement element may be concurrently monitoring loads of many other radios "seen" by its associated e-radio, wireless modem or poletop, as well as the parent radio. (A parent radio is the radio to which each totally wireless radio directs its traffic.) (In selected embodiments, the wireless modems may have limited functionality so that it cannot monitor the load of other wireless modems.)

According to the invention, the problem of accurate load measurement is solved by each device measuring, using the internal load measurement element, its own total communication time and total amount of its own idle time during a given cycle, monitoring each of the communication links and measuring the load of each individual communication link v, w, x, y, z (using the idle time/talk time measurer), and then determining locally how much load it contributes itself to the total loading of each of the communication links v, w, x, y, z by subtracting its load contribution to that link, and to obtain a net load measurement for each link of a device. This measure of net or relative load on a link is the measure of net load at the device at the other end of the link for that link.

In particular, the period of load measurement of the communication link is synchronized to the period or epoch of load measurement of the locally-originated traffic. Thus, it can be determined with accuracy what the relative contribution of each load is to the net load. Locally-generated heartbeats of known rate and pattern are employed to send the load information via the communication link, so that load measurements remain synchronized even when the measurements are not simultaneous. These load measurements are broadcast to all neighbors sharing the heartbeat.

Figure 2:
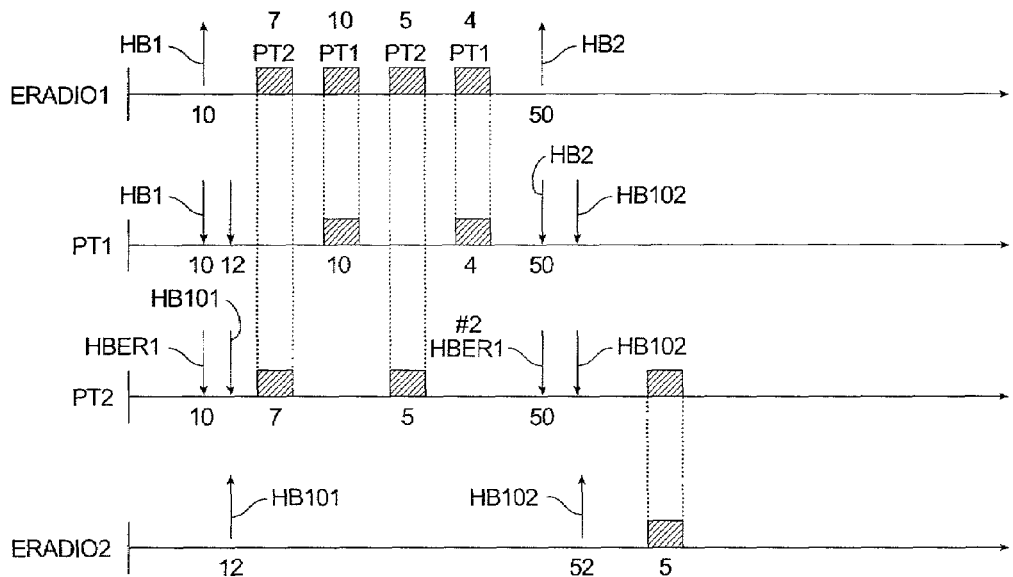
FIG. 2 is a timing diagram illustrating load measurement according to the invention among three different resources.

FIG. 2 illustrates how the loads are measured over a sequence of epochs, or long periodic frames for three devices, an e-radio, a first poletop and a second poletop. The number of paths and the number of elements may far exceed this simple example. It should be understood that there is a parent-child relationship between certain nodes. A wired device can serve as a parent but not as a child. A wireless device can be a child to a wired device or to another wireless device. At time 10, any radio that cannot be a child and thus cannot pick a parent, such as e-radio 1, broadcasts its heartbeat packet HB1. The heartbeat packet is then received by radios that can pick a parent, such as wireless devices at poletop 1 PT1 and poletop 2 PT2. Once the heartbeat HB1 is received, all counters are reset to zero or equivalent on all radios that receive that heartbeat. Thereafter, the duration of every block or epoch of time during which the e-radio is in communication exchange with another site, such as a poletop, is added to a summary counter in the e-radio. During this time, each poletop PT1, PT2 adds the duration of its communication exchange to a counter identified with each specific e-radio (or any other site with which it is in communication). The summary counter of the e-radio is then compared with the length of the epoch between heartbeats (e.g., the duration from time 10 to time 50 measured in seconds) to determine the total busy time and the total idle time during that epoch. In the example shown, the total busy time is 26 of 40 seconds. The e-radio then reports in the next heartbeat HB2 the total percentage of its own busy time, which in this example is 13/20. Thereupon, each poletop receives the broadcast busy percentage report. For example, poletop 1 PT1, knowing from its own counter the length of time it has been in communication with e-radio 1 from its device-specific counter for e-radio 1, can then compute the net busy-ness of e-radio 1. It subtracts, for example, 14 from 26 to obtain a net busy-ness of 12 seconds out of 40 seconds. Similarly, poletop 2 PT2 subtracts its 12 seconds from 26 to determine that e-radio 1 is busy 14 seconds out of 40 seconds.

This process is carried on concurrently between each e-radio and poletop in each band. At the beginning of epoch 2, PT2 may choose to communicate with another e-radio based on a comparison of the loads on the links. In this example, poletop 2 is more likely than poletop 1 to choose e-radio 2 for the second epoch, since poletop 2 sees a heavy load on e-radio 1, whereas poletop 1 sees a relatively lighter load on e-radio 1. It then reset its counters with heartbeat 102 of e-radio 2 and directs its traffic to e-radio 2, while poletop 1 resets its counters at heartbeat 2 of e-radio 1 and remains with e-radio 1.

In a real system, the congestion of a particular link is not the only factor used to select a link. It may be one factor among many, such as signal strength or success rate, which is employed to determine best path.

Figure 3:
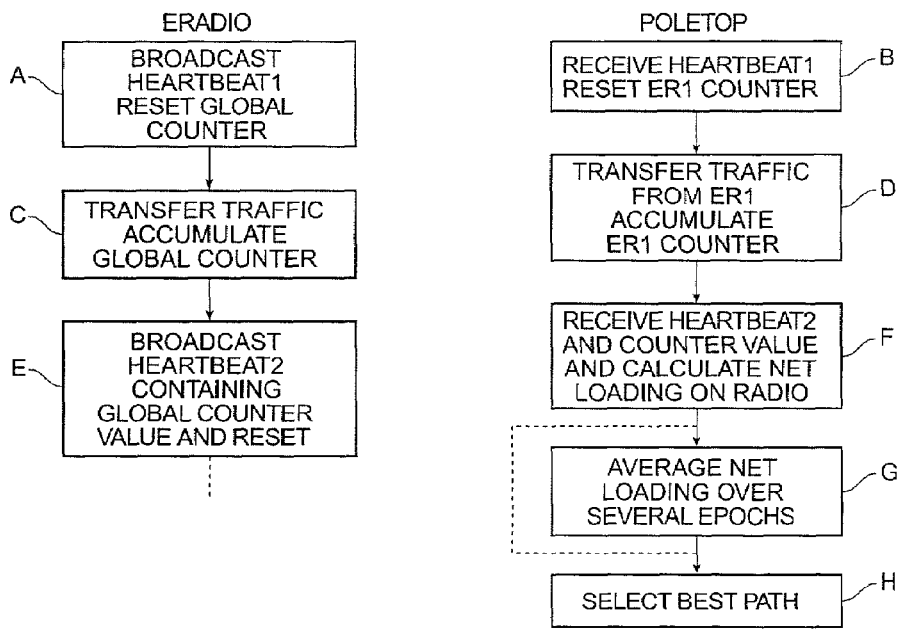
FIG. 3 is a flow chart of an algorithm for measuring loads.

FIG. 3 illustrates the algorithms for measuring load.

The process is initiated with the first radio, in this case an e-radio, broadcasting a heartbeat and resetting the global counter (Step A).

The poletops receive the heartbeat 1 and reset the counter for e-radio 1 (Step B). This occurs for each e-radio heard.

The e-radio then transfers its traffic for each poletop and accumulates the duration of the total traffic in its global counter (Step C).

Each poletop transfers its traffic with the e-radio and accumulates the duration of the traffic from the e-radio in its counter for that e-radio (Step D).

At the beginning of the next epoch, the e-radio broadcasts heartbeat 2 and the value of its global counter, then resets its global counter (Step E).

Each poletop receives heartbeat 2 and the global counter value and determines a net loading for that e-radio by factoring out or subtracting the poletop's own contribution to the global counter value of the e-radio during the prior epoch (Step F).

This measurement can then be used in connection with other factors to determine best path (Step H). The poletops may optionally average the net loading of the e-radio over several epochs before selection of the best path (Step G).

This invention factors out the load contribution for each node unlike other known mechanisms which led to the undesirable effect of instabilities under load.

Importantly, with the above load measurement technique it is possible to factor out local portions of the load over the same time frame or epoch over which the load was measured. This eliminates another source of path instability.

The invention has been explained with reference to specific embodiments. Other embodiments will be evident to those of ordinary skill in the art. It is therefor not intended that the invention be limited except as indicated by the appended claims.

What is claimed is:

1. In a packet communication system having a plurality of independently operating nodes, including a first node and a second node, which have limited available communication time and which are capable of monitoring busy time and idle time in cyclical epochs, a method for determining a load on the communication time of the first node with said second node comprising:

broadcasting from the first node a first heartbeat and thereupon resetting a global counter at the first node at a first epoch;

receiving at the second node said first heartbeat and resetting a second node counter for the first node;

transferring traffic of the first node with the second node and accumulating total traffic duration in the global counter at the first node;

receiving traffic from the first node at the second node and accumulating second node traffic duration in a first node counter at the second node;

broadcasting a second heartbeat from the first node at the beginning of the next epoch, including value of the global counter, and resetting the global counter for a second epoch;

receiving the second heartbeat and the global counter value at the second node; and determining a net loading for the first node as viewed by the second node by factoring out contribution to the global counter value during the first epoch.

2. The method according to claim 1 further including:
averaging the net loading over several epochs.

3. The method according to claim 1 further including:
using the net loading in selecting a best path for traffic of the second node.

* * * * *